Patented June 16, 1942

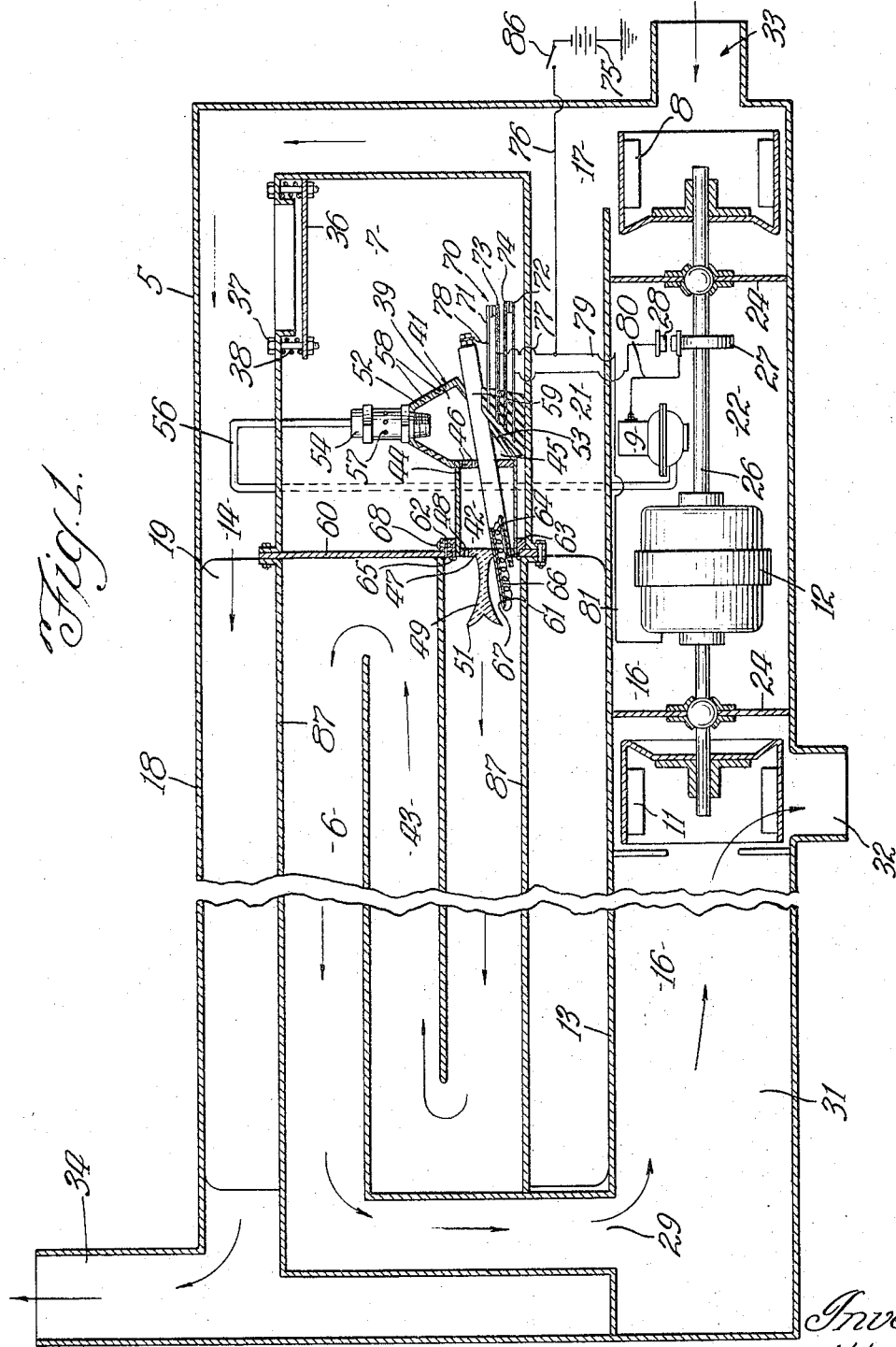

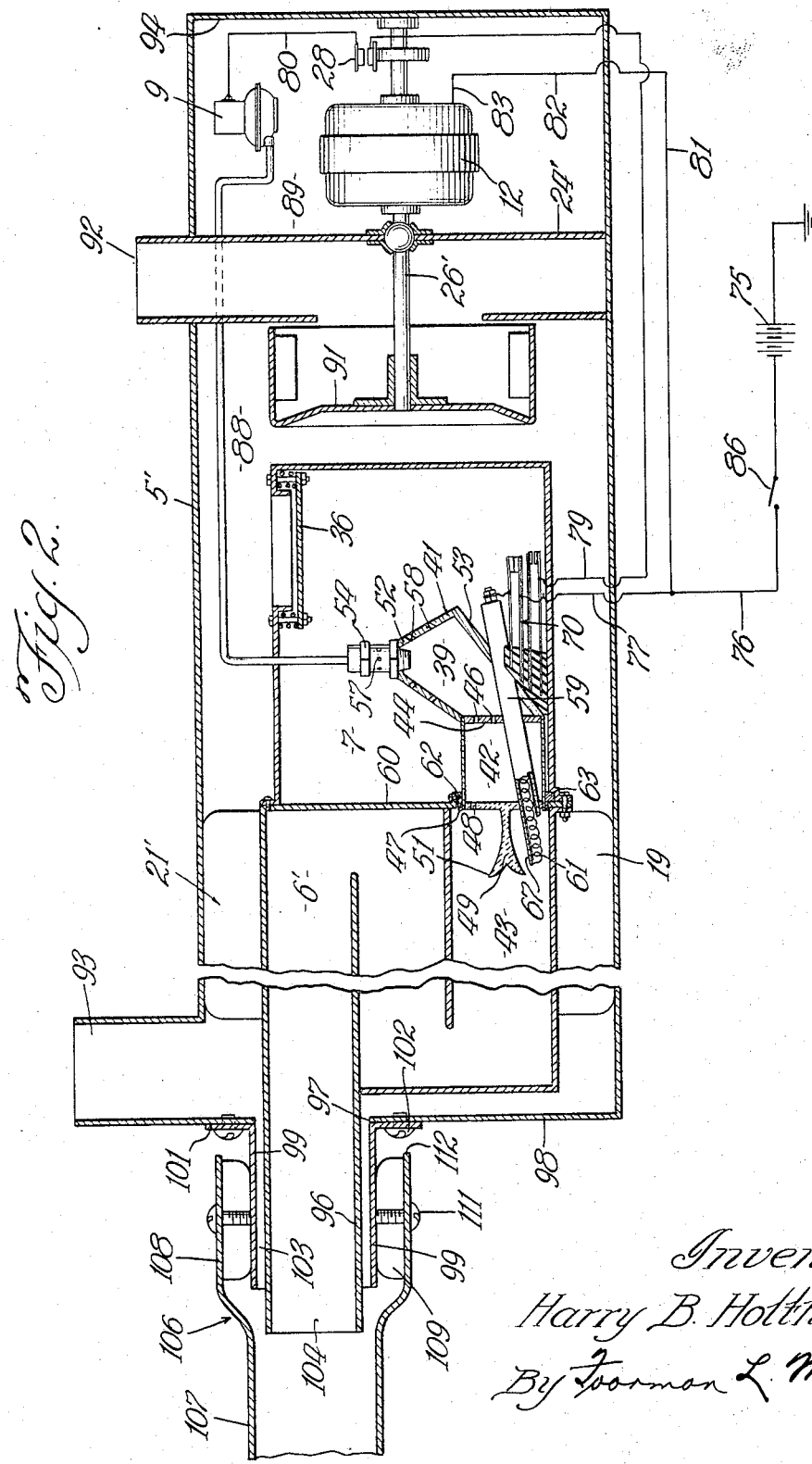

2,286,855

UNITED STATES PATENT OFFICE 2,286,855

SUCTION HEATER

Harry B. Holthouse, Chicago, Ill., assignor to Galvin Manufacturing Corporation, Chicago, Ill., a corporation of Illinois Application May 8, 1940, Serial No. 333,971

12 Claims. (Cl. 158—28)

This invention relates generally to heating devices and in particular to a low pressure automobile heater which is operable entirely independent of the automobile engine. This application is a continuation in part of application Serial No. 327,065, filed March 30, 1940.

The internal combustion type automobile heaters of the prior art are of two general classes, namely, suction and pressure heaters. These heaters are dependent for their operation upon a relatively high pressure air supply, to provide for a suitable atomization of the fuel for burning in the heater. The high pressure air is obtained by utilizing a portion of the engine power, usually by direct-connected fan or blower means for the pressure heaters, and by connection with the engine intake manifold for the suction heaters. The heaters are thus dependent for their operation upon a concurrent operation of the automobile engine, and are directly responsive to engine operating conditions. The characteristics of combustion are thus subject to great variation due to the variation in the air supplied, so that burning within the combustion chamber is erratic and of highly-varying efficiencies. The fluctuation of the air supply and the consequent surging of fuel in the combustion chamber, particularly where static fuel feeding means are used, effects a noisy burning of the fuel which is annoying and disturbing, especially when the heater is located adjacent to or in the passenger compartment of the car. This disadvantage has been overcome in part by the use of various valve controls which have been devised, particularly in the case of the suction type heaters, in efforts to provide for a substantially uniform rate of air flow through the combustion chamber. These efforts, however, have failed generally to eliminate sufficiently the objectionable factors of engine operation on the heater. Also in intake manifold connected suction heaters the heater produces reciprocal objectionable factors on the car engine by admitting into the manifold varying portions of burned and unburned mixtures, apart from the usual automobile carburetor mixture. The engine, therefore, is more efficiently operated in the summer than in the winter when it receives its hardest service.

Further, in the operation of the suction heater, the air farthest away from the suction producing means and specifically the air near the inlet of the combustion chamber, is less readily moved than the air close to such means, so that the movement of the air through the combustion chamber proceeds at a non-uniform rate. Thus in the event of a sudden increase in the back pressure in the combustion chamber, the rate of movement of the mixture flow near the inlet of the combustion chamber will be materially reduced so long as the increased back pressure continues. Since movement of the mixture through the combustion chamber is effected by the action only of the suction pressure at the outlet of the combustion chamber the period of increased back pressure is unduly prolonged; the heater operating with an insufficient amount of air for good combustion during such prolonged period. Also since the fuel admitted to the combustion chamber is in direct proportion to the air supplied, a large quantity of fuel will be drawn into the combustion chamber during a period of light load engine operation, and in the event this period is followed by a period of heavy load operation, the light load fuel charge will be starved because of the insufficient amount of air supplied to the combustion chamber during the period of heavy load engine operation. In some instances combustion may be completely stopped by a too sudden change in the quantity of air and fuel admitted to the combustion chamber. Similar operating disadvantages occur in force pressure heaters which are dependent for their operation upon the concurrent operation of the automobile engine.

These disadvantages of the usual suction and pressure heaters are best overcome by an operation of the heater independently of the car engine. However, the only power available in an automobile for operating the heater apart from the engine power is the car battery, which is of limited capacity. With the battery, generator and other associated electrical equipment as provided in the usual automobile ignition circuit, the maximum available current for heater operation is possibly about 7 amperes. It is possible, of course, that a current heavier than 7 amperes might be obtained over some periods of operation, but this heavier current would result in a serious drain on the battery, and in the winter time, would seriously interfere with the satisfactory operation of the starting of the automobile engine. The operation of an automobile heater entirely from the battery, therefore, requires a complete change in the size and assembly of the parts of the usual force and suction pressure car heaters to adapt such heaters for operation by the battery. The decrease in the size of the heater parts effects a corresponding decrease in their output capacity so that the operating pressures which can be obtained within the practical current limitations of the battery are too low to effect a mixing of the fuel by means of atomization, as is possible in the engine operated heaters where power for high pressures is readily and cheaply available. The prior art is void of any teaching pertinent to a battery-operated car heater of internal combustion type for low pressure operation and a commercial heater of this type is not known.

It is an object of this invention, therefore, to provide an improved automobile heater which is operable entirely independent of the car engine.

It is a further object of this invention to provide an automobile heater of low pressure type in which a substantially uniform rate of movement of the gas and air mixture is obtained throughout the entire length of the combustion chamber.

It is another object of this invention to provide an internal combustion heater of low pressure type which is quiet in operation and adapted for flexibility in construction by the substantial elimination of critical back pressures in the combustion chamber.

It is a further object to provide a low pressure heater in which the air and fuel is supplied to the combustion chamber at a substantially constant rate to provide for a uniform richness ratio of the combustible mixture.

Another object of this invention is to provide a heater of the internal combustion type which operates quietly and with a substantially steady burning of the mixture in the combustion chamber.

A feature of this invention is the provision of a low pressure heating device, in which a combustion chamber of elongated construction is provided with force pressure means acting on the inlet and suction pressure means acting on the outlet thereof, the force and suction pressure means being operated by a common electrical motor to provide for an automatic balancing of the loads effected by the pressure conditions in the combustion chamber, the mutually compensating operation of said suction and pressure means obtained by the balancing of the loads thereof providing for a steady burning of the mixture in the combustion chamber.

An advantage of this invention is found in the provision of a low pressure heating device in which a portion of the air supplied for combustion is utilized in providing a suction pressure at the outlet of the combustion chamber whereby to effect a reduction in the back pressure in the combustion chamber.

Another feature of this invention is the provision of a low pressure heating device in which the air and fuel supply means, the suction pressure means at the outlet of the combustion chamber, and the force pressure means at the inlet of the combustion chamber are operated by a single electric motor, to provide for a simultaneous relational operation of all of these means.

A further feature of this invention is the provision of a low pressure heating device in which an air and fuel mixing chamber is provided with thermal means and a heating element for heating the chamber to a predetermined temperature to effect a substantially immediate vaporization of the air and fuel supplied thereto; the thermal means being responsive to the temperature changes of the heating element and arranged to operate the heating element to maintain the mixing chamber at the predetermined temperature.

Yet another feature of this invention is the provision of a low pressure heating device in which an air and fuel mixing chamber is provided with thermal means and a heating element for heating the chamber to a predetermined operating temperature, the thermal means including a pair of bi-metal contact arms responsive to the temperature changes of the heating element and independently movable at different temperatures, one of the contact arms being arranged to control the operation of the heating element and the other contact arm being arranged to control the operation of the fuel supply means.

A still further feature of this invention is the provision of a low pressure heating device in which a combined heating and igniting unit is arranged in the air and fuel mixing and combustion chambers to effect a vaporization of the air and fuel in the mixing chamber and a burning of such vaporous mixture in the combustion chamber.

Further objects, features, and advantages of this invention will be apparent from the following description when taken in connection with the accompanying drawings in which:

Fig. 1 is a diagrammatic illustration of one embodiment of the invention, and

Fig. 2 is a diagrammatic illustration of a modified form of the invention.

In the practice of this invention it is contemplated that the automobile heater be operable independently of the car engine and operated entirely by power from the car battery. Since the heaviest drain on the car battery is in the wintertime, and since the heater is used only during that time, it is contemplated further that the heater operating motor be of a size to operate on about 3 amperes of current so as to be far below the average amperage rating of a normal car battery and well-within all practical factors of safety for heater current consumption. The use of a 3 ampere motor for operaitng the pressure and suction means in the heater of the invention provides for a combined pressure effect at the inlet of the combustion chamber of about 1/8" to 1/4" of water. Heaters in the prior art have been operated on pressures as low as 4" to 10" of water but it is readily apparent that this pressure is about 16 to 40 times greater than the pressures employed in applicant's heater. A pressure of 4" of water is thus relatively high and would require a motor which would be too large for commercial and practical application in a battery-operated car heater.

Fuel cannot be properly atomized by air pressures of the order of 1/8" to 1/4" of water so that air and fuel mixed at these pressures forms what is commonly referred to as a "wet mixture." Before this "wet mixture" can be efficiently burned it must be completely broken up and intimately mixed prior to ignition. The invention, therefore, contemplates the provision of means for effecting a complete mixing of the air and fuel at low pressures, by vaporization of the mixture and the burning of the mixture in a vaporous form.

With reference to the drawings there is shown in Fig. 1 a heater comprised of a housing structure 5, a combustion chamber 6, an air supply chamber 7, an air supply fan 8, a fuel pump 9, a suction fan 11, and a motor 12; the motor 12 being common to the operation of the fans 8 and 11 and fuel pump 9. The housing structure 5 is provided with a partition wall 13 to form an upper compartment 14 and a lower compartment 16, the compartments 14 and 16 being in communication with each other through passage 17. The combustion chamber 6 and air supply chamber 7 are of substantially cylindrical form and are assembled in axial alignment for disposition in the compartment 14; the chambers 6 and 7 being spaced away from the walls 13 and 18 of the housing 5 by radiating fins 19 to provide for an annular passage 21 about the combustion and air supply chambers.

The fans 8 and 11, fuel pump 9 and motor 12 are located in the lower compartment 16, with the motor 12 disposed in the motor compartment 23 which is separated from the fans 8 and 11 by partition walls 24. The motor shaft 26 is suitably supported in the walls 24, with the fans 8 and 11 mounted at the opposite ends of the shaft. The fuel pump 9 is located in the motor compartment 22, the pump being illustrated as of solenoid actuated type and operated by the motor 12 through cam 27 and breaker assembly 28, as will be later fully described. It is to be understood, however, that a bellows or diaphragm pump mechanically actuated by a cam (not shown) on the motor shaft 26 may be used in place of the solenoid pump 9. The fan 11 is arranged at the outlet 29 of the combustion chamber 6, to draw the mixture therefrom into a passage 31 for discharge from the heater through the outlet 32. The fan 8 operates to draw air into the heater through inlet 33 for circulation through the passages 17 and 21; the air being discharged from the heater through the outlet 34. The inlet 33 may be arranged to draw air into the heater from either the inside or outside of the car passenger compartment and the outlet 34 may be suitably connected to pass the heated air into the passenger compartment. Air for combustion enters the air supply chamber 7 from air passage 17 through the valve 36. The valve 36 which is illustrated as of flat disc type is supported from the top wall of the chamber 7 by suitable screws or the like 37 and is held in a normally open position by springs 38 which are positioned about the screws 37. It is to be understood that the valve 36 may be satisfactorily located in any of the walls of the chamber 7 and that a flat or poppet valve may be used in place of the disc valve shown. The air in chamber 7 is admitted into an air and fuel mixing chamber 39, which will now be fully described.

The mixing chamber 39 includes an enclosure 41 which is located within the chamber 7 and adjacent an equalizing chamber 42 which is of substantially cylindrical form and in alignment with and located at the inlet of the passage 43 in the combustion chamber 6. The equalizing chamber 42 which is also located in the chamber 7, is of integral construction with the chamber 39 and is separated therefrom by a circular partition or baffle plate 44, which is provided in a heat conducting metal such as copper; the plate 44 being secured to the inner wall of the chamber 42 as by brazing or like means. Communication between the chambers 39 and 42 is through apertures 46, which are formed in the partition member 44. The equalizing chamber 42 is separated from the combustion chamber 6, and specifically from the passage 43 therein, by a circular partition 47 which is provided in a suitable heat insulating refractory material. The partition 47 near the peripheral edge thereof, is formed with apertures 48 to provide space communication between the chamber 42 and the combustion chamber passage 43. The central portion of the partition 47 is imperforate and is formed with an extension 49 which extends longitudinally therefrom into the combustion chamber 6. The outer or free end of the extension 49 is formed with radially extending prongs or fingers 51 which attain a red glow during operation of the heater to function as igniter elements.

The enclosure 41 for the mixing chamber 39 is formed with a cone portion 52 and an inclined wall portion 53 which is oppositely disposed from the cone portion 52. Fuel is admitted into the mixing chamber 39 through an injection nozzle 54, which is suitably mounted in the apex of the cone portion 52 and is connected to the fuel pump 9 through a supply line 56. The nozzle 54 is formed with apertures 57 for admitting a portion of the supply air from the chamber 7 into the fuel stream prior to its admission into the mixing chamber 39. Another portion of air from the supply chamber 7 is admitted into the mixing chamber through air ports 58 which are formed in the cone portion 52 in a manner to progressively direct the air into the fuel stream after its ejection from the nozzle 54. The opposed disposition of the nozzle 54 and wall 53 causes the air and fuel mixture from the nozzle 54 and ports 58 to impinge upon the preheating portion of a combination preheating and igniting element 59 which is supported in part in the inclined wall 53 and is slantingly arranged longitudinally of the mixing chamber 39 and equalizing chamber 42 through the partitions 44 and 47, the preheating portion being disposed in the chamber 39 and the igniting end 61 extending into the combustion passage 43 to a position between the igniter elements 51 and the ceramic partition wall 47. A further portion of air from the supply chamber 7 is admitted into the air and fuel mixture, after ignition thereof, through apertures 62, which are formed in a holding collar 63 and the combustion chamber wall 60, the air therethrough being passed directly from the air supply chamber 7 into the combustion passage 43. The collar 63 is mounted about the chamber 42 and is formed with an extending annular lip portion 65 adapted to fit about the wall 60, tightening of the screws 68 acting to hold the chambers 39 and 42 in position at the inlet of passage 43, in an obvious manner.

The heat element 59 includes a resistance coil 64 which is inserted in an insulating tube 66 which in turn is mounted in a copper tubular sleeve 67. The element 59 is in heat conducting relation with the inclined wall 53 and with the copper partition plate 44, the end 61 thereof being formed to partially expose a portion of the resistance wire 64, which is turned downwardly in the combustion chamber to effect a more ready ignition of the mixture passing into the chamber 6, since any condensation of the fuel from the combustible mixture will occur near the wall portions of the chamber 42 with the condensate tending to drop or accumulate at the bottom of such chamber. Projection of heat from the end 61 of the heating means 59 accomplishes ignition rather than the heat surrounding the housing 67. The projected heat is confined at the end 61 by the ceramic partition 47, the degree of ignition heat being determined essentially by the wall input to the resistance 64 and being contemplated in the invention to be about 1800° F.

As previously noted the rating of the motor 12 is about 3 amperes, which amperage effects an operating speed of about 3750 R. P. M., and since the fuel pump 9 and fans 8 and 11 are correspondingly small the pressure of the fuel and air entering the mixing chamber 39 is too low to effect a proper atomization of the air and fuel mixture for efficient combustion. The air and fuel, therefore, is preheated in the mixing chamber 39 to an optimum temperature which provides for a most advantageous mixing thereof, those portions of the heating element 59 positioned within the mixing and equalizing chambers 39 and 42, respectively, acting to heat the mixing and equalizing chambers and their surrounding walls to a temperature which will effect a complete vaporization and mixing of the air and fuel. The preheating unit does not operate as a hot spot as such is considered with reference to a heater element or portion but operates to heat the mixing and equalizing chambers and their surrounding walls, the variation in the temperature within the chambers and their surrounding walls being about 10° F. The temperature in the mixing and equalizing chambers, however, is at all times less than that which would effect an ignition or burning of the fuel within such chambers.

The chambers 39 and 42 are maintained at a predetermined minimum operating temperature by means of a thermal switch unit 70 which is responsive to the heat of the heating means 59. The unit 70 is insulatingly mounted on the outside of the inclined wall portion 53 and extends outwardly into the air supply chamber 7, the unit being comprised of bi-metal contact arms 71 and 72, having associated contact arms 73 and 74, respectively. The bi-metal arms 71 and 72 are movable independently of each other and are adapted for movement at different temperatures; bi-metal switch 71—73 being in a normally closed position and arranged in the electrical circuit of the heating element 59, and bi-metal switch 72—74 being normally open and arranged in the electrical circuit of the fuel pump 9. Energization of the heating element 59 is obtained by connection thereof to a suitable electrical source such as the car battery 75, the circuit from the battery including conductors 76 and 77, arms 72 and 71, and conductor 78; the circuit being completed to ground by connection of the resistance wire 64 to the copper tubing 67 at the heater end 61. The conductor 76 is also common to the circuit of the motor 12 and fuel pump 9, the motor being connected directly to the battery 75 by the conductors 76 and 81; and the circuit for the fuel pump including conductors 76 and 77, arms 74 and 72, conductor 79, breaker assembly 28 and conductor 80.

The operation of the heater is started by closing the main switch 86, which effects a simultaneous operation of the heating element 59 and fans 8 and 11, the circuit of the fuel pump 9 being opened by the normally open bi-metal switch 72—74. When the heating element 59 reaches a temperature of about 75° F., the bi-metal arm 74 is moved into contact with the arm 72 to close the circuit of the fuel pump 9. A time delay is thus provided between the start of operation of the heater element 59 and the fuel pump 9 to assure a burning of the fuel admitted into the chamber 39, whereby to prevent an accumulation of raw fuel in the combustion chamber 6. Since the fans 8 and 11 and pump 9 are all operated by the motor 12, the air and fuel supplied to the mixing chamber 39 through the nozzle 54 and air ports 58 is supplied at a corresponding rate to provide for an air and fuel mixture in the chamber 39 of substantially uniform richness ratio. The air and fuel thus admitted into the mixing chamber is impinged against the inclined wall 53 and heater element 59, the resultant mixture being forced through the apertures 46 in the partition wall 44 and into the equalizing chamber 42 by the pressure effected in the air supply chamber 7 by the force fan 8 and suction fan 11. From the equalizing chamber 42 the mixture passes through the aperture 48 in the ceramic partition 47 into the combustion chamber 6 where it is ignited by the hot end 61 of the heating element 59.

The continued operation of the heater element 59 provides for an increase in the temperature of the chambers 39 and 42. When the temperature reaches a value of about 200° F., which represents a minimum operating temperature for effecting an advantageous mixing of the low pressure air and fuel for efficient combustion, the bi-metal arm 71 moves out of engagement with the contact arm 73 to effect an opening of the heater element circuit and a consequent stopping of operation of the heating element; the fans 8 and 11 and fuel pump 9 continuing in operation. At this operating temperature the fuel and air impinged on the heating element 59 and also against the inclined wall 53 is substantially immediately vaporized, to provide for its intimate mixing, the inclination of the wall 53 serving to deflect the mixture against the heat-conducting partition wall 44 to substantially completely vaporize the air and fuel mixture before its passage through the apertures 46 into the equalizing chamber 42. The apertures 46 are arranged in the partition wall 44 in that portion above the heater element 59, the lower portion of the wall being imperforate to form a small receptacle or reservoir 45 at the bottom of the chamber 39 between the partition wall 44 and the inclined wall portion 53. Since the free fuel particles in the chamber 39 tend to drop to the bottom of the chamber, they are collected in the reservoir 45 in proximity to the heating element and in a contacting position with the air in the mixing chamber to provide for their vaporization and passage into the chamber 42, through the apertures 46, in a vaporous form. Any unmixed fuel is thus retained in the chamber 39 until it is properly conditioned for an efficient burning in the combustion chamber 6. The mixture admitted to the chamber 42 is maintained in a vaporized condition by the heat produced therein by the element 59, the chamber 42 by virtue of the restricting action of the insulating plate 47 to the mixture flow therein, functioning to distribute the vaporized mixture substantially uniformly over the sectional area of the combustion passage 43, to reduce to a minimum the occurrence of any free rich or lean portions in the mixture. This vaporous mixture on entering the combustion chamber 6, is ignited by the igniter elements 51, which have been heated to a red glow during initial combustion. If any backfiring should occur during heater operation, the valve 36 will close in response to the increased pressure in chamber 7 to prevent any of the burned mixture from passing into the passages 17 and 21.

The efficient combustion of the fuel mixture in the chamber 6 continues until the temperature in the mixing chamber 39 falls below about 200° F., at which time the bi-metal arm 71 moves into contact with contact arm 73 to again energize the heating element 59. When the temperature of the chamber 39 is again increased to about 200° F., the bi-metal arm 71 breaks away from the contact arm 73 to again open the circuit of the heater element 59. This cyclic action of the bi-metal switch 71—73 continues during normal operation of the heater, the operation of the heater being stopped by opening the switch 86.

In the event element 59 fails, for some reason, to become energized on closing of the switch 71—73, air and fuel will continue to be supplied to the chamber 39 until the temperature of the chamber drops below about 75° F., at which time the bi-metal arm 72 will break its contact with the arm 74 to open the fuel pump circuit, thus leaving only the fans 8 and 11 in operation. Raw fuel is thus prevented from accumulating in the combustion chamber 6, the continued operation of the fans serving to sweep or scavenge the chamber 6 of such fuel. Operation of the fans is stopped by opening the switch 86. Since the bi-metal arm 72 is responsive to the heat condition of the heating element 59, fuel is admitted to the chamber 39 only after the chamber has been raised to a temperature of about 75° F. by the operation of the heating element, the fuel supply being stopped when the temperature of the chamber falls below such temperature, so that fuel is supplied to the heater both at the start of and during heater operation only when the heating element is capable of operation.

During the normal operation of the heater a portion of the heat from the combustion chamber is transmitted through the chamber walls 60 and 67 and also through the heater element 59 to the mixing chamber 39, so as to decrease the dissipation of heat from the mixing chamber 39 by the cooling action of the vaporization of the air and fuel in the chamber 39. The heat thus transmitted from the combustion chamber lessens or compensates to some extent the effects of this cooling action on the heating element 59 and wall 53 and in this manner acts as a saving device to reduce the frequency of operation of the heating element 59 by the thermal unit 70. A drifting of the temperature in the mixing chamber is substantially eliminated by the location of the thermal unit 70, as previously described, in close proximity to the heater element 59, this location of the unit providing for an immediate control of the heater element and hence for a practically constant operating temperature in the mixing and equalizing chambers, since the time lag between the conflicting heat effects on the heater 59 and operation of the unit 70 in response to such effects is reduced to a minimum.

It is to be understood, however, that the energization of the heating element 59 by the action of the bi-metal arm 71 does not indicate a failure of combustion in the chamber 6, since the operating temperature of the mixing chamber 39 is independent of the heat from the combustion chamber. Energization of the heating element 59, may thus be the result of a sudden change in the temperature of the air and fuel entering the mixing chamber 39, the mixture being processed independently of the burning conditions in the combustion chamber 6 and the bi-metal switch 71 operating to energize the heating element only in repsonse to the temperature conditions in the mixing chamber 39.

The function of the heater element 59 to maintain the chamber 39 at a substantially constant predetermined operating temperature, and the control of the heater element 59 by the thermal unit 70 is facilitated by the arrangement of the heater element and motor circuits, as will now be explained. The conductor 76, as previously noted, is common to the circuits of the heater element 59, pump 9, and motor 12. Thus upon an initial closing of the switch 86 the line drop in conductor 76 is the result of the combined loads of the heater element, and motor. However, upon the mixing chamber 39 being heated to its optimum temperature, which causes the bi-metal arm 71 to break contact with arm 73, the line drop in the conductor 76 is the result only of the loads of the motor 12 and pump 9, the pump, as previously explained, being started after the operation of the heating element and fans. Since the line drop effected in the conductor 76 by the heater element is proportionately high as compared to that of the pump and motor, breaking of the heater element circuit causes a speeding up of the motor 12, to a speed which is about 30 per cent higher than its speed with the heater element circuit closed. This speeding up of the motor 12 also speeds up the fans 8 and 11, so that a greater amount of air is drawn in by the fan 8 for circulation about the radiating fins 19 and a greater amount of air is also supplied to the chamber 7 through valve 36, to provide for a leaning of the mixture in the chamber 39. Upon an increase in the line drop in conductor 76 by the concurrent energization of the heater element, pump and motor circuits, the motor 12 slows down so that the amount of air circulated about the fins 19 and the amount of air supplied to the combustion chamber 39 is correspondingly decreased. A slowing down of the motor 12 is thus concurrent with the energization of the heater element 59 so that heating of the chamber 39 by the heater element 59 is aided by a decrease in the dissipation of heat from the heater by the fan 8. Since heat, therefore, is being carried away from the parts surrounding the chamber 39 at a decreased rate during times of heater element energization, the heat generated by the heater element is more effectively and rapidly localized in the chamber 39. Also the reduction in the supply of air to the supply chamber 7 concurrently with energization of the heater element 59 provides a richer mixture being formed in the chamber 39 and hence an automatic choking effect, whereby to assure a positive and ready combustion of the mixture and a rapid return of the heater to optimum operating conditions. The temperature of the chamber 39 is thus confined between substantially close operating limits to reduce temperature drifting therein to a minimum during normal operation of the heater.

Since the quantity of air admitted into the heater device is relatively small, the mixture in the chamber 39 will be normally relatively rich, so that it is rapidly and readily ignited by the end 61 of the element 59. This rich mixture, however, although readily ignited is not adapted for a complete and efficient burning. To provide for the complete burning of the mixture a portion of the air from the air chamber 7 is admitted through the apertures 62, previously described, into the combustion chamber 6 after the ignition of the mixture by the end 61 of the heater element 59, which operates in a region of rich mixture. The rich mixture from the chamber 42 is thus first ignited by the heater element 59 and after ignition is leaned by the addition of the supplementary air from the ports 62 to provide for its complete burning. The quantity of air admitted through the apertures 62 into the chamber 6 is controlled directly by the pressure created in the chamber 7 by the fan 8 and, therefore, is in accordance with the richness ratio of the mixture in the chamber 39.

In the normal operation of the heater the common motor drive 12 for the fans 8 and 11 and fuel pump 9 provides for a simultaneous relational operation of these parts to provide for a mixture in the chamber 39 of substantially uniform richness ratio and a movement of the mixture through the combustion chamber 6 at a substantially uniform rate. Movement is imparted to the mixture at the combustion chamber outlet 29 by the suction fan 11 simultaneously with movement of the mixture at the inlet of the combustion chamber, as effected by the force fan 8. The mixture is thus simultaneously moved at both ends of the combustion chamber so that a scavenging action of substantially uniform intensity is effected throughout the entire length of the combustion passage 43. In the occurrence of a back pressure in the combustion chamber the suction fan 11 is choked in its operation by a reduction in the quantity of mixture available at the combustion outlet 29. This choking of the suction fan 11 effects a decrease in the capacity of the fan 11, so that its load on the motor 12 will be correspondingly decreased to provide for a speeding up of the motor 12. The increase in speed of the motor 12 not only increases the speed of the suction fan 11 but also increases the speed of the force fan 8 to provide for an increase in the pressure of the air in the supply chamber 7 and a consequent increase in the air pressure applied at the inlet of the combustion chamber 6. The back pressure in the combustion chamber 6 is thus acted upon by an increase in the suction pressure at the combustion outlet 29 and by an increase in the force or positive pressure at the inlet to the combustion passage 43. The fluid circulating fans 8 and 11, therefore, provide compensating effects, due to the balancing of the loads thereof by the motor 12, to provide pressure conditions at each end of the chamber 6 to overcome the back pressure occurring therein. The heater is thus rapidly conditioned for operation under normal conditions. The suction fan 11, therefore, operates to effect automatic suction pressure changes and the fan 8 automatic positive pressure changes, in response to back pressures in the combustion chamber 6 to provide for a steady burning of the mixture in the combustion chamber with a minimum of noise.

Since the modified form of the invention shown in Fig. 2, is similar in many respects to the embodiment of Fig. 1, similar numerals of reference, shall be used to designate similar parts. The heater comprises a housing 5' of substantially cylindrical form, which has arranged therein a combustion chamber 6', an air supply chamber 7, a fan compartment 88 and a motor compartment 89, the compartments 88 and 89 being separated by a partition wall 24'. The combustion chamber 6' and air supply chamber 7 are assembled in longitudinal alignment and are concentrically spaced from the housing structure 5' by radiating fins 19 to form an annular passage 21' between the chambers 6' and 7 and the housing structure 5'. A fan 91 is arranged in the fan compartment 88 to draw air into the heater through the inlet 92 for circulation about the fins 19 in the annular passage 21' and discharge through the outlet 93, the inlet 92 and outlet 93 being suitably connected to provide for a heating of the car passenger compartment. The fan 91 is mounted at one end of the motor shaft 26' which is suitably journaled in the partition wall 24' and in the end wall 94 of the structure 5'. The motor 12 and fuel pump 9 are located in the motor compartment 89 and are similar in structure and operation to the corresponding parts previously described in connection with Fig. 1. A portion of the air from the fan 91 is supplied to the chamber 7 through valve 36, the parts located in the chamber 7 being similar in structure and operation to the corresponding parts of Fig. 1, so that a further description thereof is believed to be unnecessary.

The combustion chamber 6' is provided with a projecting end section or conduit 96, which extends through an opening 97 formed in the end wall 98 of the housing 5'. The opening 97 is somewhat larger in diameter than the conduit 96 so that an annular space is formed between the conduit 96 and the peripheral edge of the opening 97. Concentrically disposed about the chamber section 96 and in alignment with the opening 97 is an annular housing or tubing 99 having a flange 101 which is adapted for assembly with the structure 5' by means of screws 102 or like means. There is thus formed between the chamber section 96 and the housing 99 an annular passage 103 which is in communication with the annular passage 21'. A portion of the air circulated through the passage 21' is thus diverted or by-passed through the passage 103 for discharge from the heater; the air flowing through the passage 103 providing for an ejector or suction action at the outlet 104 of the combustion chamber, whereby to reduce the back pressure in the chamber 6'. Movement is thus imparted to the mixture at both ends of the combustion chamber 6' so that a substantially uniform rate of flow of the mixture is obtained through the entire length of the chamber 6'.

A further reduction in the back pressure in the combustion chamber 6' is obtained by cooling the mixture at the outlet 104. The cooling means include a tubular sleeve 106 having a reduced section 107 with a diameter substantially equal to that of the housing 99. The enlarged section 108 of the sleeve 106 is adapted for concentric spacing about the housing 99 by means of spacers 109 to form an annular passage between the housing 99 and the enlarged section 108. The sleeve 106 is frictionally secured to the housing 99 by means of screws 111. Since the annular passage 109 is in communication at its end 112 with atmospheric air a flow of recirculated air through the annular passage 103 will effect a flow of atmospheric air through the annular passage 109, the mixing of the cool atmospheric air with the air from the passage 103 providing for a substantial cooling of the fluid or gas and mixture at the outlet 104 to provide for an increased reduction in the back pressures in the combustion chamber 6'.

Operation of the heater in Fig. 2 is started by closing the switch 86, the fuel pump 9 and fan 91 being operated simultaneously by the motor 12; the circuits for the motor 12, fuel pump 9 and thermal unit 70 being the same as that described in connection with Fig. 1. A portion of the air supplied by the fan 91 is supplied to the chamber 7 for mixture with the fuel from the pump 9 in the mixing chamber 39, the remaining air being passed through the annular passage 21' for discharge through the annular passage 103 and outlet 93. The amount of air passing through the passage 103 is proportionally small as compared to the air discharged through the outlet 93, so as not to effect to any appreciable degree the quantity of heated air which is supplied to the car compartment from the outlet 93. Since the force pressure effected in the supply chamber 7 and the suction pressure effected at the outlet 104 are both the result of operation of the fan 91, these pressures maintain a corresponding operating relation during the normal operation of the heater so that a substantially uniform rate of flow of the mixture through the combustion chamber 6' is maintained at all times. The operation of the heater is stopped by opening the switch 86.

The invention is thus seen to provide for a heater of pressure-suction type which is operated entirely independently of the car engine and which is completely operable from the electrical power available in the car battery. The heater is of rugged and simple construction and is substantially noiseless in operation. The provision for a suction action at the outlet of the combustion chamber and a positive pressure at the inlet thereof provides for a smooth uniform flow of the combustible mixture through the entire length of the combustion chamber, the initiation of movement of the mixture or fluid at each end of the combustion chamber providing for a positive scavenging action and a substantial elimination of critical back pressures. The invention provides further for a heater in which the air and fuel supply means and the suction and force pressure means are operated by a common motive power to provide for a simultaneous relational operation thereof, so that the rate at which air and fuel is fed to the combustion chamber is substantially constant and in correspondence with the rate of flow of the mixture through the combustion chamber to in all provide for an even and steady burning of the mixture in the combustion chamber.

It is to be understood that the relative temperature values used in the above description are representative for one kind of fuel and will vary for different kinds of fuels. It is to be understood also that only preferred embodiments of the present invention have been illustrated and described herein and that alterations and modifications thereof can be made which are within the full intended scope of the invention as defined by the appended claims.

I claim:

1. In a heating device, the combination of a combined preheating and igniting unit, a combustion chamber, an equalizing chamber, and an air and fuel mixing chamber, said three chambers being arranged with the equalizing chamber between said combustion and mixing chambers, perforated partitions at each end of said equalizing chamber, said preheating and igniting unit being positioned in said three chambers and extending through said partitions, one end portion of said unit acting to heat the air and fuel in said mixing chamber and the other end portion acting to ignite such heated mixture in said combustion chamber, with the central portion of said unit acting to heat the mixture during its passage through the equalizing chamber.

2. In a heating device, the combination of an air and fuel mixing chamber provided with a wall portion and an inclined portion arranged on opposite sides thereof, and having an outlet, said wall and inclined portions being thermally connected and the wall portion having air ports concentrically arranged about a part thereof, a perforated plate extending entirely across said outlet and being thermally associated with said wall and inclined portions, a fuel injection nozzle located in said part, the said air ports being arranged to direct the air passing therethrough into the mixing chamber for mixing with the fuel stream from said nozzle, and heating means positioned in the path of the air and fuel from said ports and nozzle and extending through said inclined portion and perforated plate, said heating means acting to heat said wall and inclined portions and said perforated plate, the air and fuel entering the mixing chamber being immediately heated and substantially completely vaporized by said heating means and inclined portion and passage through said perforated plate.

3. In a heating device, the combination of a combustion chamber, an equalizing chamber and an air and fuel mixing chamber, with said equalizing chamber being between said combustion and mixing chambers, a perforated partition extending entirely across each end of said equalizing chamber, said mixing chamber having a wall portion at one end and an inclined portion at the opposite end thereof, said two portions being in thermal connection with one of said perforated partitions, said wall portion being formed with air ports arranged concentrically about a part thereof, a fuel nozzle in said part, the air from said ports being directed to mix with the fuel entering the mixing chamber from said nozzle, and a combination heating and igniting unit positioned in said three chambers and extending through said perforated partitions and inclined portion, said unit being thermally conductive with said inclined portion and said one perforated partition to heat said wall and inclined portions and said one perforated partition, the air and fuel entering the mixing chamber being immediately heated and substantially completely vaporized by said combination unit and inclined portion and passage through said one perforated partition, the mixture being maintained in a vaporous form in said equalizing chamber by the unit portion therein, and being ignited in vaporous form by the unit portion located in the combustion chamber.

4. In a heating device of internal combustion type, the combination of a fuel conditioning unit having an inlet and an outlet and including an air and fuel mixing chamber and an equalizing chamber, perforated means separating said two chambers, with said mixing chamber being between said inlet and said perforated means, means for supplying air and fuel to said mixing chamber, means heating said mixing chamber to substantially a fuel vaporizing temperature, means for retaining the mixture in a substantially vaporous form during its passage through said equalizing chamber, and means preventing all portions of said mixture from passing directly through said equalizing chamber including perforated means extending across said equalizing chamber near said outlet.

5. In a heating device of internal combustion type, the combination of a fuel conditioning unit having an outlet and including an air and fuel mixing chamber and an equalizing chamber arranged adjacently to said mixing chamber, means supplying air and fuel to said mixing chamber, said mixing chamber having heat conducting wall portions, with one of said wall portions being perforated for fluid connecting said two chambers, heating means for vaporizing fuel in said mixing chamber, means maintaining the mixture in said equalizing chamber substantially at a fuel vaporizing temperature, means preventing a direct flow of all portions of said mixture through said equalizing chamber including means extending across said equalizing chamber near said outlet having passage portions therein, and means igniting the mixture from said equalizing chamber.

6. In a heating device of internal combustion type, the combination of a fuel conditioning unit having an outlet and including an air and fuel mixing chamber and an equalizing chamber arranged adjacently to said mixing chamber, means supplying air and fuel to said mixing chamber, electrical means in said mixing chamber for heating the same to a fuel vaporizing temperature, said mixing chamber having heat conducting wall portions, with one of said wall portions being perforated to fluid connect said two chambers, said heating means having a heat conducting end portion extending outwardly from said mixing chamber through another wall portion thereof, with its opposite end portion being heat conducting and projecting through said one wall portion into said equalizing chamber, the heat from said opposite end portion serving to retain the mixture in said equalizing chamber in a substantially vaporous form, an energizing circuit for said heating means including thermal switch means mounted on said one end portion, said thermal switch means being responsive in action to the heat from said heating means to control the operation of the same in maintaining the mixing chamber substantially at said fuel vaporizing temperature, means extending across said equalizing chamber near the outlet of said conditioning unit having passage portions therein, and means igniting the mixture from said equalizing chamber.

7. In a heating device of internal combustion type, the combination of fuel conditioning means including an air and fuel mixing chamber having an inlet and an outlet, means for supplying air and fuel to said mixing chamber at said inlet, a combination electrical heating and igniting unit extending through said chamber and across said inlet and having an igniting portion at one end, the opposite end of said combination unit projecting outwardly from said mixing chamber and the intermediate portion of said combination unit being positioned in said chamber for heating the same, a perforated member arranged across said conditioning unit near said outlet, said igniting portion being supported in said perforated member but positioned outwardly of said mixing chamber, and thermal switch means mounted on said opposite end in heat exchange relation therewith and in electrical connection with said combination unit to control the operation of the same, said thermal switch means being responsive in action to the heat from said combination unit.

8. In a heat generator, the combination of an air and fuel mixing chamber and a combustion chamber, electrically operated means for supplying air and fuel to said mixing chamber, electrical means for heating said mixing chamber to a fuel vaporizing temperature, so that said fuel is in a substantially vaporous form prior to its passage into said combustion chamber, a circuit for said fuel supply means including a normally open bi-metal switch, a circuit for said heating means including a second normally closed bi-metal switch, said two bi-metal switches being thermally connected with said heating means so as to be responsive in operation to the heat from said heating means, and a control switch common to said two circuits, said control switch when initially closed providing for an energization of said heating means, with said first switch operating to close the circuit for said fuel supply means when the heat from said heating means is at substantially said fuel vaporizing temperature, said second switch means opening on an increase of said heating means to a temperature above said fuel vaporizing temperature, with the control of said heating means by said second switch means serving to maintain said mixing chamber substantially at said fuel vaporizing temperature independently of the heating conditions in said combustion chamber.

9. In a heat generating device of internal combustion type, a liquid fuel vaporizing chamber having an inlet and an outlet, a partition plate intermediate said inlet and outlet extending completely across said chamber and having perforations over a portion thereof, with said plate and at least one wall of said chamber being composed of a heat conducting material, means supplying air and fuel to said chamber at said inlet, means for heating said chamber to at least a fuel vaporizing temperature, with said fuel supply means being arranged to direct the fuel therefrom against said one wall prior to the passage of said fuel through the perforations in said partition to said outlet so that the fuel is substantially completely vaporized by the heat in said plate and wall for mixing with said air, and means near said outlet for distributing said mixture substantially uniformly over the entire cross section of said outlet.

10. In a heater having a combustion portion with an inlet, the combination of means for preparing a liquid fuel for burning in said combustion portion including a first region for mixing said fuel with air, air moving means fluid-connected with said first region to supply air thereto, means supplying fuel to said first region, a second region fluid-connected with said first region wherein all portions of the mixture admitted thereto from the first region are intermingled, and means within said two regions and extending within said combustion chamber inlet for continuously heating the air and fuel together in both regions to vaporize the fuel for mixing with the air and retaining the mixture in a vaporous form for burning in the combustion portion.

11. In a heater having a combustion portion, the combination of walled means for preparing a liquid fuel for burning in said combustion portion having a first region therein for mixing said fuel with air, air supply means having a portion fluid-connected with said first region, means supplying fuel to said first region, with said air being circulated within said first region for mixing with said fuel, said walled means having a second region fluid-connected with said first region and combustion portion wherein the fuel admitted thereto from the first region is dispersed substantially uniformly throughout the mixture, and means for heating the air and fuel together in both regions to vaporize the fuel for mixing with the air.

12. In a heater having a combustion portion, the means for preparing fuel for igniting in said combustion portion and for igniting the same therein, including in combination walled means having a first region with fuel and air introduced and mixed therein, a second region fluid-connected with said first region and with said combustion portion, said fuel and air being further prepared in said second region for igniting, and an electrical coil in said first region and in said second region and having a portion extending into said combustion portion, said electrical coil acting in said two regions to vaporize and maintain vaporized fuel therein and to heat the air mixed with the fuel therein, said vaporous mixture passing into the combustion portion, and the extending portion of said coil acting to ignite the vaporous mixture in said combustion portion.

HARRY B. HOLTHOUSE.